Patented Oct. 1, 1929

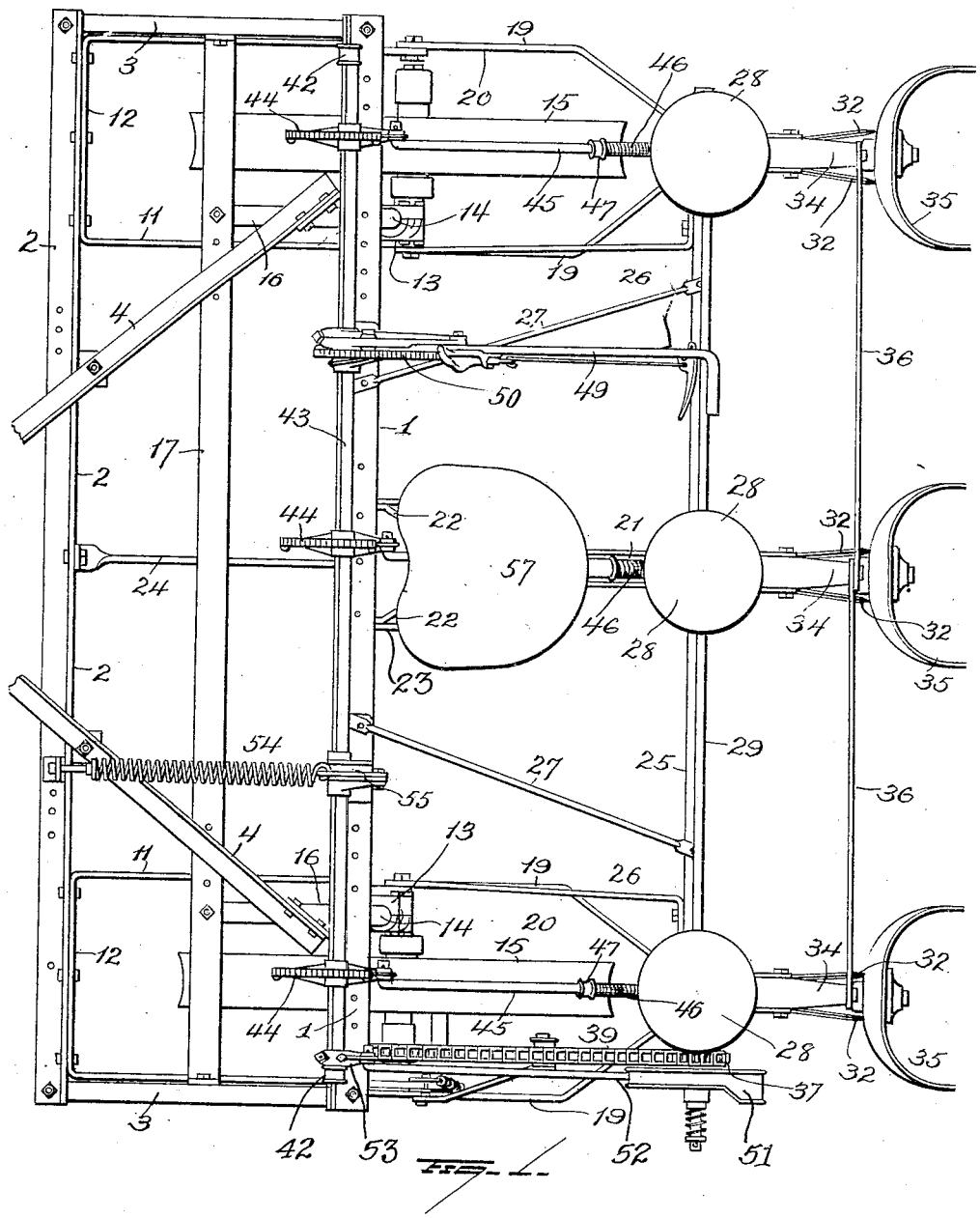

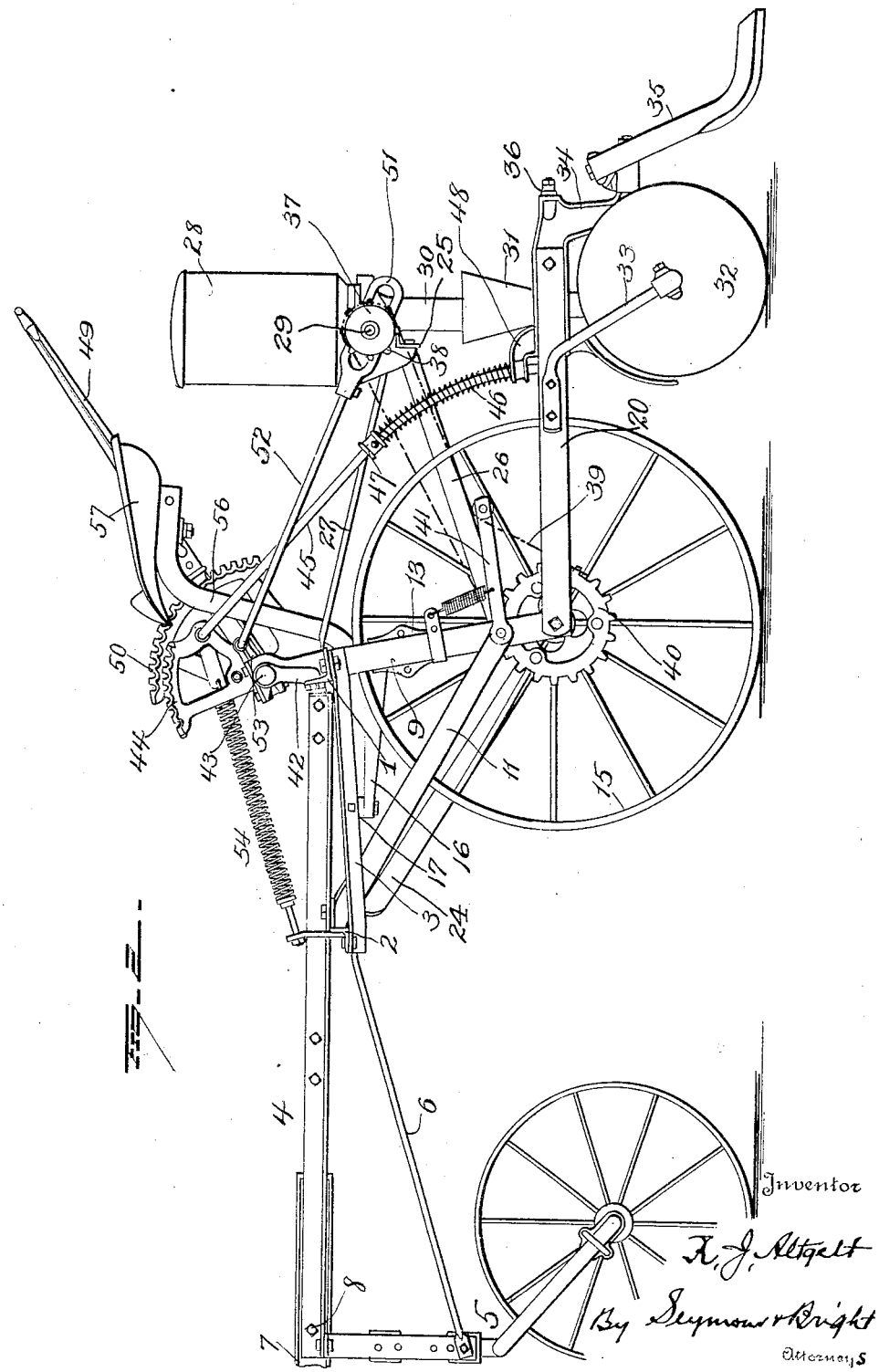

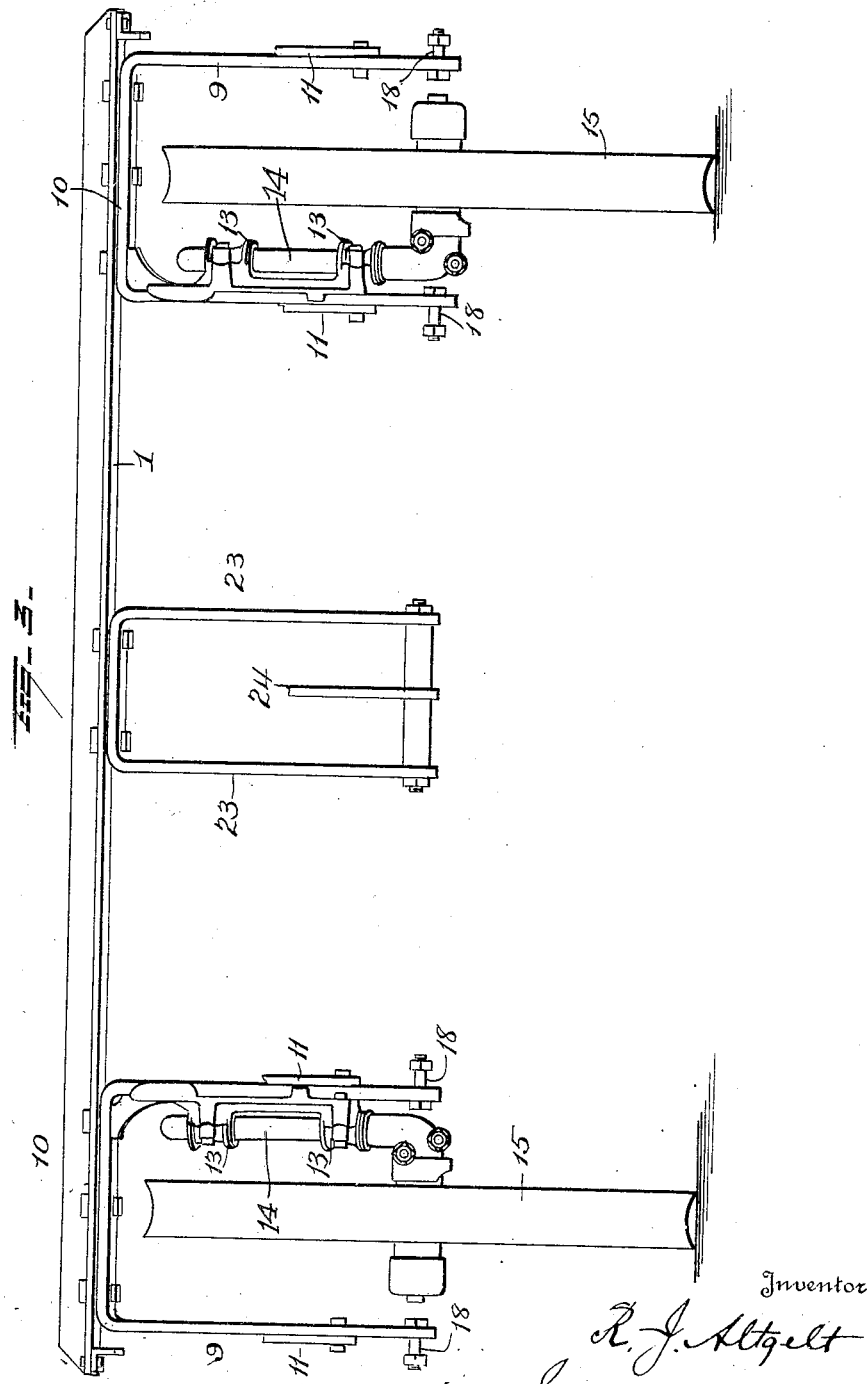

1,729,642

UNITED STATES PATENT OFFICE

RUDOLPH J. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

PLANTER

Application filed June 8, 1926. Serial No. 114,462.

This invention relates to improvements in planters one object of the invention being to provide a construction embodying split or two-part beams with which the furrow openers and covers are connected in which the said beams shall be made to straddle the carrying wheels and connected with the frame at points within the radii of the carrying wheels, and in which the lifting means shall be connected with the beams in line with the longitudinal axes thereof and in rear of the carrying wheels.

With this and other objects in view, the invention consists in certain novel features of construction and combinations of parts as hereinafter set forth and pointed out in the claims.

In the accompanying drawings;

Figure 1 is a plan view of a planter embodying my improvements;

Figure 2 is a side elevation, and

Figure 3 is a rear view of a portion of the main frame assembly.

The framework of the planter includes a main frame comprising front and rear transverse angle iron frame bars or beams 2 and 1 connected at their ends by side bars 3. Diagonally disposed frame bars 4 are rigidly connected with the parallel bars or beams and converge beyond the front bar 2. A front truck or carriage 5 is located at the forward end of the forwardly projecting frame formed by the converging bars 4 and serves to support the forward weight of the planter, said truck or carriage being suitably braced as indicated at 6. The rear portion of pole 7 is disposed between the forward portions of the converging bars 4 and has hinge or pivot connection therewith as indicated at 8 to permit vertical swinging movement of said pole.

Inverted U-shaped supports or yokes 9 depend from end portions of the rear transverse frame bar 1 and have their upper horizontal members 10 rigidly bolted to said frame bar 1 and said yokes are braced by U-shaped braces 11 having their parallel arms secured to the parallel arms of the yokes 9 and their connecting members 12 securely bolted to the front transverse frame bar 2. Brackets 13 are secured to one depending arm of each supporting yoke 9 and provide bearings for the vertical portions of axles 14 having spindles passing through the hubs of carrying wheels 15,—said wheels being thus so located that they will be partially embraced by the supporting yokes 9.

The axles 14 are provided at their upper ends with forwardly projecting arms 16 integral therewith or rigidly secured thereto and these arms are secured to or rigidly connected with a transverse frame beam 17, the latter being also secured at its ends to the side bars 3 of the main frame so that the axles 14 will be prevented from turning in their bearings on the yokes or supports 9.

Near the lower ends of the depending arms of each supporting yoke 9, shoulder bolts 18 are located, and to these bolts, the forward ends of the members 19, 19 of split or two-part beams 20 are connected, so that each of said beams 20 is connected with the frame work in horizontal alinement with the axis of a carrying wheel and straddles the latter. While I have shown and described the connection of the two side beams 20 with the framework as being in alinement with the axes of the carrying wheels 15, such connections might be out of such alinement but within the radii of said wheels. By providing for connection of the beams with the framework within the radii of the wheels, preferably in alinement with the axes of the wheels, I am enabled to employ short beams and thus not only economize material but insure the strength and rigidity of the beam. An intermediate beam 21 is so located that it will normally occupy a position centrally between the split or two-part beams 20. Arms 22 are connected with the central beam 21 and these arms are connected with a yoke 23 secured to the rear frame bar 1 and said yoke is connected by a brace 24 with the front frame bar 2. The central beam and the outside beams may be made laterally adjustable.

A transverse angle bar or beam 25 is located rearwardly of the rear bar 1 of the main frame and is supported by brace bars 26 secured thereto and to the depending yokes or supports 9, and also by brace rods 27 secured at their rear ends to said bar or beam 25 and at their front ends to the rear transverse beam 1 of the main frame.

The angle bar or beam 25 supports a series of seed cans 28 and the feed mechanism (not shown and which may be of any approved construction) at the bottoms of the seed cans receives motion from a shaft 29 disposed parallel with the bar or beam 25. The seed will be discharged from each seed can through a tube 30 to a boot 31. The boots 31 are suitably supported by the beams (20, 21) and discharge seed into furrows opened by furrow openers. Furrow opener disks 32 are shown and these are supported by brackets 33 secured to the beams 20, 21. The beams 20, 21 are provided at their rear ends with brackets 34 which carry coverers 35. I have shown furrow openers of the disk type, but if desired furrow openers consisting of small lister bases might be employed and disk coverers may be used instead of the type of coverers shown in the drawing. The rear end portions of the several beams (20—21) are connected by tie bars 36 so as to prevent relative lateral displacement of said beams.

A clutch mechanism is indicated at 37 for connecting a sprocket wheel 38 with the shaft 29 of the seed feeding means or disconnecting said sprocket wheel from operative connection with said shaft. The sprocket wheel 38 receives motion, through the medium of a sprocket chain 39, from a sprocket wheel 40 secured to one of the carrying wheels 15. A tightener 41 may be provided for the sprocket chain.

Bearing brackets 42 are located on the frame bar 1 and provide bearings for the rounded end portions of a shaft 43, which latter is preferably made angular in cross section. To this shaft, arms 44 are secured and are shown in the form of toothed segments so that they may be employed to receive the detents of hand levers (not shown) when the framework is equipped with cultivating mechanism. Rods or bars 45 are pivotally connected at their upper forward ends with the arms 44 and the lower curved ends of these rods or bars are connected with the beams (20, 21) in line with the longitudinal centers of said beams, the connections of bars 45 to the split or two-part side beams being rearwardly of the carrying wheels and the connection of the intermediate rod or bar 45 with the intermediate beam 21 being in horizontal alinement with the connections of the other rods or bars 45 with the side beams 20. A presser spring 46 is located on the lower curved portion of each rod or bar 45 and severally bear at their upper ends against collars 47 secured to the respective rods or bars 45, the lower ends of said springs bearing against brackets 48 carried by the beams (20, 21) and through which brackets, said rods or bars 45 pass.

A hand lever 49 is secured to the shaft 43 whereby the manipulation of the beams 20, 21 may be effected, and lever 49 is provided with a suitable detent for cooperation with a toothed segment 50 secured to the frame bar one.

The clutch mechanism 37 hereinbefore referred to includes a clutch operating member 51 and this member is connected, by a rod 52 with an arm 53 secured to the shaft 43. When the beams 20, 21 are raised by manipulation of the lever 49, motion imparted to the clutch mechanism through the medium of the arm 53, rod 52 and member 51, will cause the stopping of the seed feeding means, as will be readily understood.

If desired, a balancing spring 54 may be employed, one end of said spring being connected with an arm 55 on the shaft 43 and the other end of said spring being connected with the frame bar 2.

A seat support 56 is suitably secured to the framework and a seat 57 on said support is located near the rear frame bar 1 and approximately over a line passing through the hubs of the carrying wheels.

Having fully described my invention what I claim as new and desire to secure by Letters Patent is:—

1. In a planter, the combination with a frame, of yokes depending from a member of said frame, axles having vertical portions carried by said yokes, wheels receiving said axles and located between the depending arms of the yokes, beams connected with said yokes at respective sides of the respective wheels, means tying the beams together, and rigid connections between the frame and the vertical portions of the axles to prevent rotation of said axles.

2. In a planter, the combination with a frame, of yokes depending from a member of said frame, axles carried by said yokes, said axles having arms at their upper ends, wheels receiving said axles and straddled by said depending yokes, a bar secured to said axle arms and to the frame, two-part beams straddling said wheels and connected with the respective yokes at respective sides of the wheels, and means preventing lateral displacement of said beams.

3. In a planter, the combination with a frame, of depending yokes secured thereto, axles carried by said yokes, wheels straddled by said yokes and receiving said axles, beams straddling the wheels and connected with said yokes at respective sides of the respective wheels, a shaft mounted on the frame, a lever secured to said shaft, arms secured to said shaft, and devices connecting said arms with the beams, the connections of said devices with the beams being behind the wheels and approximately in line with the longitudinal axis of the beams.

4. In a planter, the combination with a frame, yokes depending from one member of said frame, bracing means connected with
said yokes and secured to another member
of said frame, axles supported by said
yoke, carrying wheels straddled by said
yokes and receiving said axles, beams connected with said yokes at respective sides of
the respective wheels, a rear transverse beam,
braces connecting said transverse beam with
said frame, braces connecting said transverse
beam with said yokes, seed cans supported by
said transverse beam, a feed operating shaft
mounted on said transverse beam, means for
operating said shaft from one of said carrying wheels, a shaft mounted on said frame,
a lever for operating said shaft, connections
between said shaft and the beams, and connections between said shaft and the feed operating shaft whereby the latter will be thrown
out of operation when the beams are raised
by manipulation of said lever.

In testimony whereof, I have signed this
specification.

RUDOLPH J. ALTGELT.